(Model.)

N. & M. CHENEY.
BOARD AND WIRE FENCE.

No. 257,847. Patented May 16, 1882.

Witnesses
Fred Bigg
Wm Wright

Inventor
Nothers Cheney
Moses Cheney

N. PETERS. Photo-Lithographer, Washington, D. C.

UNITED STATES PATENT OFFICE.

NATHAN CHENEY, OF FAIRMOUNT, ILLINOIS, AND MOSES CHENEY, OF COSHOCTON, OHIO.

BOARD AND WIRE FENCE.

SPECIFICATION forming part of Letters Patent No. 257,847, dated May 16, 1882.

Application filed November 25, 1881. (Model.)

*To all whom it may concern:*

Be it known that we, NATHAN CHENEY and MOSES CHENEY, citizens of the United States, residing respectively at Fairmount, in the county of Vermillion and State of Illinois, and at Coshocton, in the county of Coshocton and State of Ohio, have invented certain new and useful Improvements in the Construction of Board and Wire Fasteners, to be used in building board and wire fence in fastening the boards or wire to growing timber without loss or damage to the trees; and we do hereby declare that the following is a full, clear, and exact description of the invention, which will enable others to make or have made and to use the same.

Heretofore in building board and wire fence and using growing timber for posts the boards and wire have been fastened by staples or nailed direct to and against the trees, which, in growing, push the boards or wire off of said trees, or become stunted by said boards or wire being nailed to the same.

The object of our invention is to arrange a spike or hook in such a manner as to fasten said boards or wires to growing timber without injuring the growth thereof, instead of placing posts in the ground, which are liable to decay and easily blown down, while with growing timber for posts the fence is daily becoming firmer and stronger. We attain this object by the use of a spike with staple attached and a hook, which prevent the boards and wire from coming in contact with said timber, which you will see illustrated in the accompanying diagram, in which—

Figure 1 is a complete representation of the fastener for wire. A represents a spike of wrought-iron, with two holes punched near one end. B is a staple through which the wire passes, and then said staple is clinched to hold the said wire firmly in its place.

Fig. 2 is a representation of the fastener for boards, in which A' is a hook made of wrought-iron, and turned upward to admit the board. This hook has one or more holes punched in the turned part. B' is a wrought-iron nail, which is put through the hole in A', and is used to rivet the board firmly to the hook which holds it from the tree.

Figure 3:
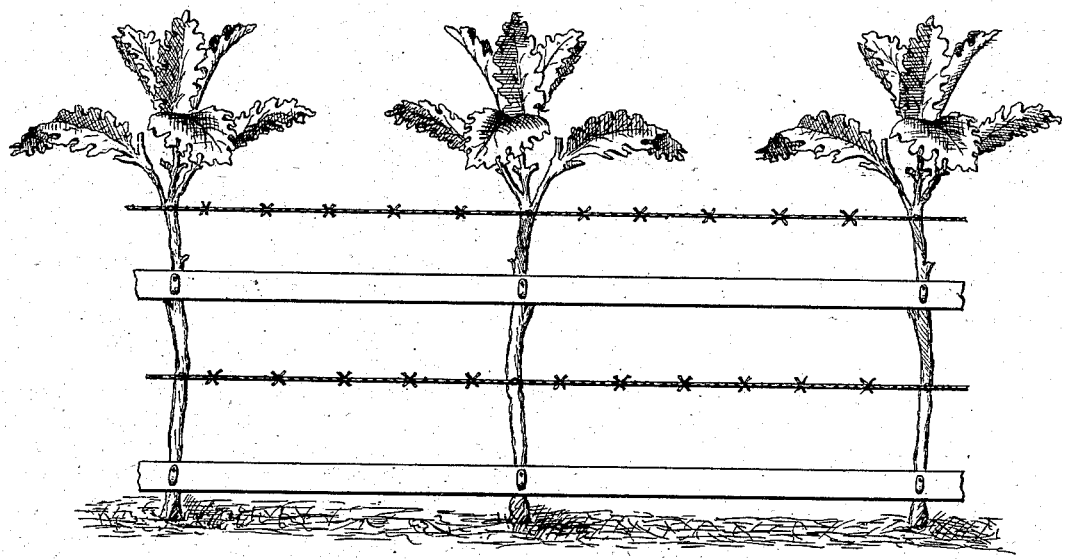
Fig. 3 is a front elevation of our fence.
Figure 1:
Figure 2:
Figure 4:
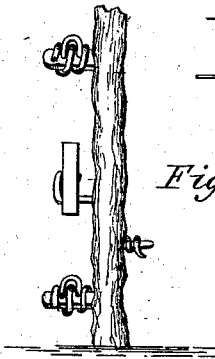
Fig. 4 is a side elevation of one of the posts, showing the fasteners in place.

We are aware that prior to our invention wire fences had reached a high state of improvemet, as the patent of P. L. Sherman, bearing date of September 13, 1870, and numbered 107,297, relating to the same, clearly indicates; but What we do claim as our invention, and desire to secure by Letters Patent, is as follows, to wit:

The combination, with fence wires or boards and posts consisting of growing timber, of spikes driven into said timber and having at their outer ends means for securing said wires or boards, the said means and boards or wires being located a sufficient distance from said timber to prevent the dislodgment of said spikes and boards by the force exerted by the timber in growing, substantially as described.

NATHAN CHENEY.
MOSES CHENEY.

Witnesses:
WM. WRIGHT,
FRED BIGGS.